(12) United States Patent
Koon

(10) Patent No.: US 10,955,010 B2
(45) Date of Patent: Mar. 23, 2021

(54) STAMPED COVER FOR CLUTCH SYSTEM

(71) Applicant: Schaeffler Technologies AG & Co. KG, Herzogenaurach (DE)

(72) Inventor: Alexander Koon, Valley View, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 27 days.

(21) Appl. No.: 16/299,696

(22) Filed: Mar. 12, 2019

(65) Prior Publication Data

US 2020/0292012 A1    Sep. 17, 2020

(51) Int. Cl.
*F16D 25/0638*   (2006.01)
*F16D 25/12*     (2006.01)
*F16D 13/58*     (2006.01)

(52) U.S. Cl.
CPC ......... *F16D 25/0638* (2013.01); *F16D 13/58* (2013.01); *F16D 25/12* (2013.01)

(58) Field of Classification Search
CPC ....... F16D 25/06–0638; F16D 2125/08; F16D 25/12; F16D 2300/26
See application file for complete search history.

(56) References Cited

U.S. PATENT DOCUMENTS

| | | | |
|---|---|---|---|
| 4,148,384 A | 4/1979 | Stinson | |
| 5,788,399 A | 8/1998 | Smearsoll | |
| 7,104,381 B2* | 9/2006 | Miyazaki | F16D 25/0638 |
| | | | 192/48.61 |
| 7,140,481 B2* | 11/2006 | Hagenow | F16D 25/0638 |
| | | | 192/85.42 |
| 8,997,961 B2* | 4/2015 | Absenger | F16D 21/06 |
| | | | 192/48.619 |
| 9,080,615 B2* | 7/2015 | Kato | F16D 13/683 |
| 9,845,832 B2* | 12/2017 | Heuver | F16D 25/0638 |
| 10,132,364 B2* | 11/2018 | Deneszczuk | F16D 13/52 |
| 10,544,841 B2* | 1/2020 | Ishikawa | F16H 57/0472 |
| 2004/0168878 A1* | 9/2004 | Yabe | F16D 48/02 |
| | | | 192/106 F |
| 2004/0228680 A1 | 11/2004 | Loe | |
| 2008/0017469 A1* | 1/2008 | Iwasaki | F16H 57/02 |
| | | | 192/48.5 |
| 2017/0002874 A1 | 1/2017 | Herkommer et al. | |
| 2018/0062469 A1 | 3/2018 | Satyaseelan et al. | |
| 2018/0298955 A1* | 10/2018 | Fujita | F16D 13/58 |

FOREIGN PATENT DOCUMENTS

| | | |
|---|---|---|
| JP | 2001241467 A | 9/2001 |
| JP | 2011112172 A | 6/2011 |

* cited by examiner

*Primary Examiner* — Ernesto A Suarez
*Assistant Examiner* — James J Taylor, II
(74) *Attorney, Agent, or Firm* — Volpe Koenig

(57) ABSTRACT

A cover for a clutch system with a hydraulic piston is axially retained by a retaining ring. The cover has a retaining feature to radially retain this retaining ring against centrifugal forces.

13 Claims, 3 Drawing Sheets

STAMPED COVER FOR CLUTCH SYSTEM

FIELD OF INVENTION

The present disclosure relates to a clutch system, and, more particularly, to a cover plate for a clutch system with a retaining feature on the clutch plate to engage a retaining ring on a shaft.

BACKGROUND

The present disclosure relates to a clutch system comprising a clutch (friction clutch/friction coupling) and clutch actuator for a drivetrain of a motor vehicle including a rotating shaft, for example a passenger vehicle, truck, bus, or an agricultural utility vehicle, comprising a piston displaceable in the axial direction of the clutch device to engage and disengage clutch disks of a clutch pack with a crankshaft of an internal combustion engine. The hydraulically displaceable actuating piston assembly drives a piston toward a counterpressure plate on an opposite side of the clutch pack. A cover plate holds pressure in the piston.

During use, hydraulic pressure forces the cover plate axially away from the piston, which is undesirable. Moreover, with the shaft rotating, centrifugal forces may cause rotating elements to move radially outwardly and cause rotating rings to expand radially outwardly.

SUMMARY

The present disclosure is directed to preventing unwanted movement or disengagement due to hydraulic and centrifugal forces, overcoming these and other problems of the prior art such as complicated assembly and high material costs. The present disclosure is directed retaining feature formed in a cover plate to engage a retaining ring on a shaft.

In one aspect, the present disclosure is directed to a clutch device for a drivetrain of a motor vehicle including a hydraulic piston for actuating a clutch pack, a cover plate, an inner seal, an outer seal, and a retaining ring. The cover plate defines a hydraulic chamber between the cover plate and a piston, the cover plate having a retaining feature. The inner seal is for mounting between the cover plate and the shaft. The outer seal is for mounting between the cover plate and a piston. The retaining ring is for preventing axial movement of the cover plate away from the hydraulic piston. The retaining feature limits radial expansion of the retaining ring and maintains engagement between the retaining ring and the cover plate.

In another aspect, the present disclosure is directed to a cover plate for providing a hydraulic pressure chamber for a piston of a clutch system for a motor vehicle including a first axial side, a second axial side, a radially inner terminal end oriented toward the first axial side, a radially outer terminal end, and a retaining feature. The first axial side is for defining a pressurized chamber for a hydraulic piston. The retaining feature is machined from the terminal end. The retaining feature includes a radially extending face, a rounded corner, and an axially extending face. The retaining feature is sized for engaging a retaining ring to prevent axial movement of the cover and configured to prevent radial expansion of the retaining ring

BRIEF DESCRIPTION OF THE DRAWING(S)

The foregoing Summary and the following detailed description will be better understood when read in conjunction with the appended drawings, which illustrate a preferred embodiment of the present disclosure. In the drawings.

DETAILED DESCRIPTION OF THE PREFERRED EMBODIMENT(S)

Figure 1:
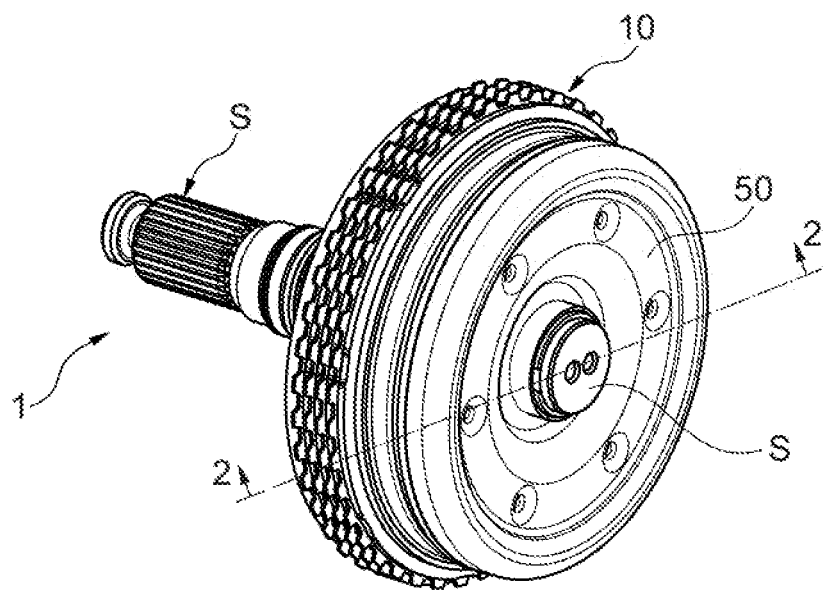
FIG. 1 is a perspective view of a clutch assembly applicable to the present application.

The present disclosure relates to a retention feature of a cover plate of a clutch assembly for holding a retaining ring. The retention feature and retaining ring are specifically designed for the purposes discussed herein.

At the outset, it should be appreciated that like drawing numbers appearing in different drawing views identify identical, or functionally similar, structural elements. Furthermore, it is understood that this present disclosure is not limited only to the particular embodiments, methodology, materials and modifications described herein, and as such may, of course, vary. It is also understood that the terminology used herein is for the purpose of describing particular aspects only, and is not intended to limit the scope of the present disclosure, which is limited only by the appended claims.

Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the present disclosure, the following example methods, devices, and materials are now described.

Certain terminology is used in the following description for convenience only and is not limiting. The words "front," "rear," "upper" and "lower" designate directions in the drawings to which reference is made. The words "radially inwardly" and "radially outwardly" refer to directions radially toward and away from an axis of the part being referenced, or more generally, relative to a shaft supporting the part being referenced. "Axially" refers to a direction along the rotational axis of a shaft or other part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import. "About" as used herein when referring to a measurable value such as an amount, a temporal duration, and the like, is meant to encompass variations of ±5% from the specified value.

Figure 2:
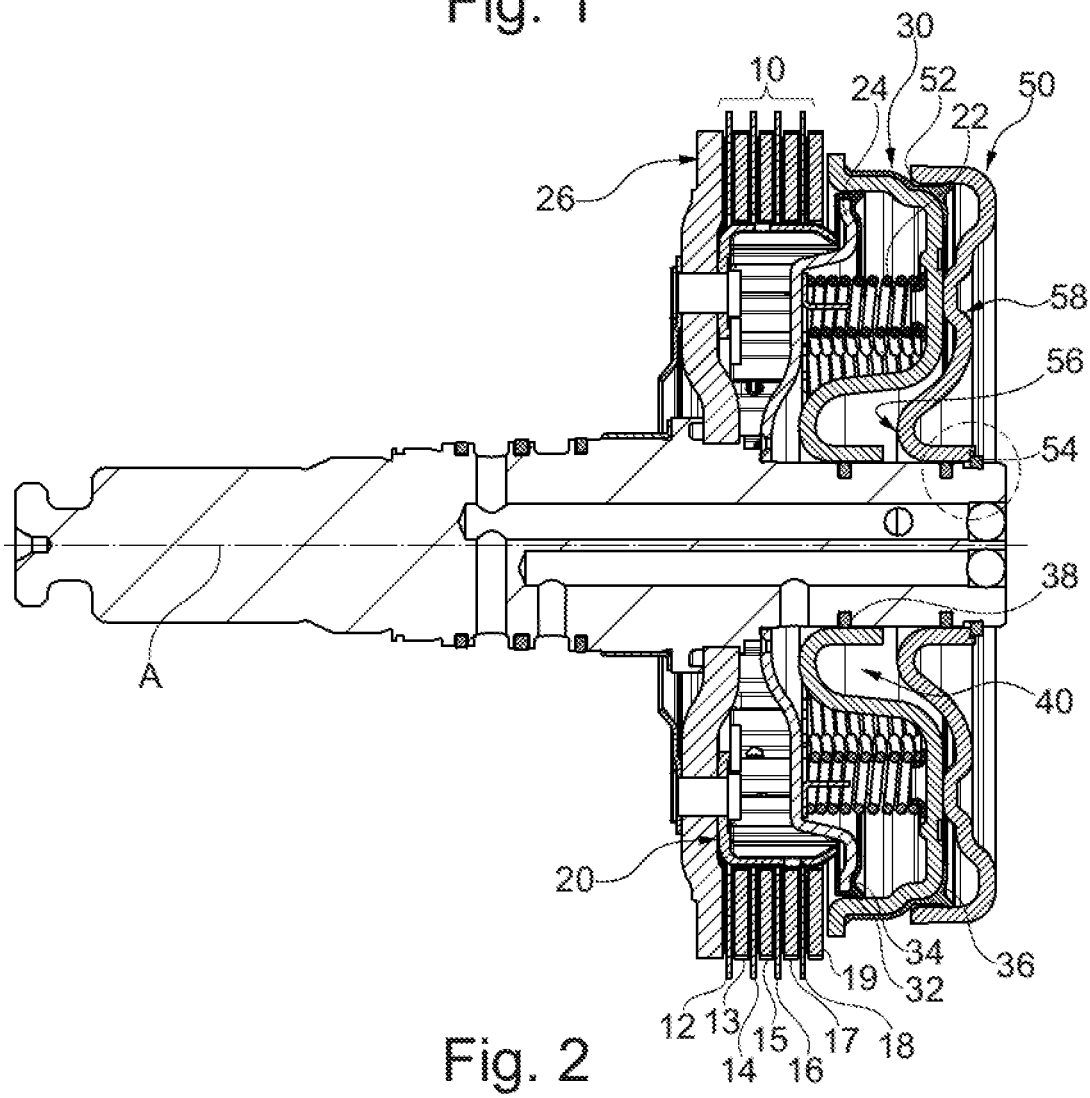
FIG. 2 is a side cross-sectional view of the clutch assembly of FIG. 1 taken along the line 2-2.

Referring to FIGS. 1 and 2, an exemplary clutch system 1 is shown according to an embodiment of the present application and mounted to a shaft S that rotates about its axis A. The clutch assembly 1 includes a clutch pack 10 with a one or more clutch plates 12, 14, 16, 18 interspersed with clutch disks 13, 15, 17, 19 supported by a plate carrier 20. One skilled in the art would recognize that although four clutch plates and clutch disks are illustrated, other amounts may constitute the clutch pack 10. A plate carrier 20 supports the clutch pack 10. A spring 22, such as a coil spring, is mounted between a balance dam 24 and a piston 32 and biases them outward away from each other (and therefore biases the clutch pack 10 to disengagement) as discussed further below. A counterpressure plate 26 is positioned against the clutch pack 10 and the plate carrier 20.

A piston assembly 30 includes the piston 32 mounted to an outer diameter (OD) of the shaft S, a first seal 34 between the piston and the balance dam 24, a second seal 36 between the piston and a cover plate 50, and a third seal 38 between the piston and the shaft S. A hydraulic chamber 40 is defined between the piston 32 and the cover plate 50. The seals 34, 36, 38 are sufficient to maintain high pressure within the hydraulic chamber 40 while allowing axial movement of the piston 32 as discussed further below.

In use, high pressure fluid may be provided to the hydraulic chamber 40 to activate the piston assembly 30. The pressurized fluid drives the piston 32 toward the clutch pack 10 and the counterpressure plate 26 (i.e., leftward in the FIG. 2 perspective), overcoming the spring force of the spring 22. As a result, the clutch pack 10 is compressed together and effectively engages with the shaft S to transfer vehicle power as is generally understood in the art. Subsequently when the pressure in the hydraulic chamber 40 is sufficiently reduced, the spring 22 drives the piston 32 away from the clutch pack, resulting in disengagement of the clutch plates 12/14/16/18 and clutch disks 13/15/17/19.

The cover plate 50 includes a first terminal end 52 in a radially outer position and proximate the seal 36, a second terminal end 54 in a radially inner position and proximate a seal 55 at the OD of the shaft S, a first axial side 56 facing the hydraulic chamber 40 and piston assembly 30, and a second axial side 58 facing away from the hydraulic chamber and piston assembly. The first terminal end 52 is oriented toward the piston assembly 30, and the second terminal end 54 is oriented away from the piston assembly 30. The seal 55 is mounted in a groove 2 of the shaft. To hold the cover plate 50 axially in place against hydraulic pressure (i.e., to prevent the cover plate from being forced rightward in the FIG. 2 perspective), the cover plate 50 includes a retaining feature 60 configured to interact with a retaining ring 90. The cover plate 50 may be, for example, a stamped metal part.

Figure 3:
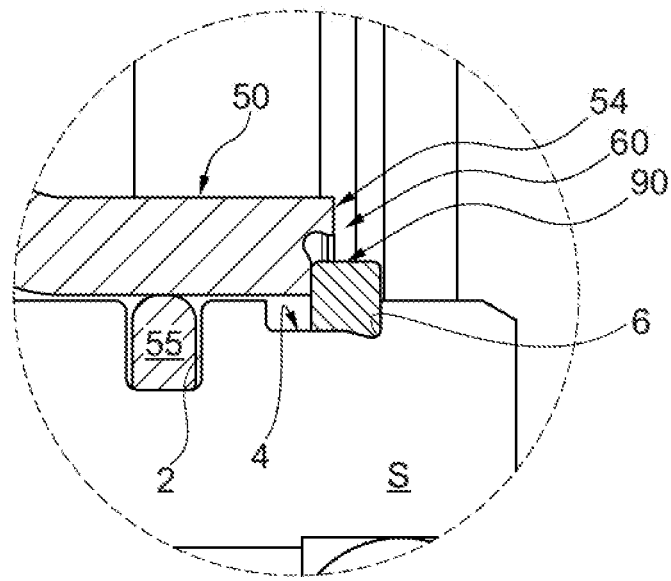
FIG. 3 is a partial enlarged view cross-sectional view of the clutch assembly of FIG. 1.
Figure 4A:
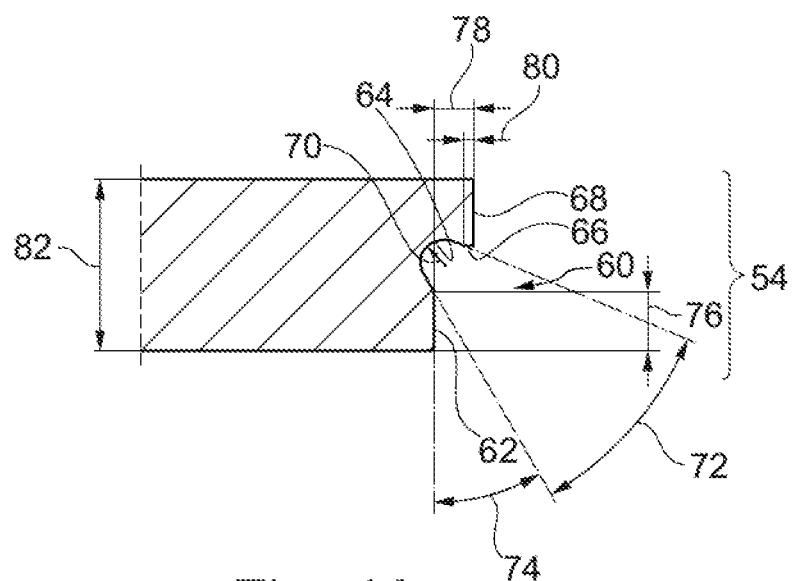
FIG. 4A is a partial enlarged view of a cover plate of the clutch assembly of FIG. 1.
Figure 4B:
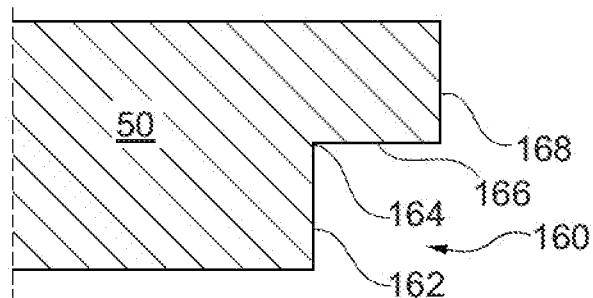
FIG. 4B is a partial enlarged view of another cover plate of the clutch assembly of FIG. 1.
Figure 4C:
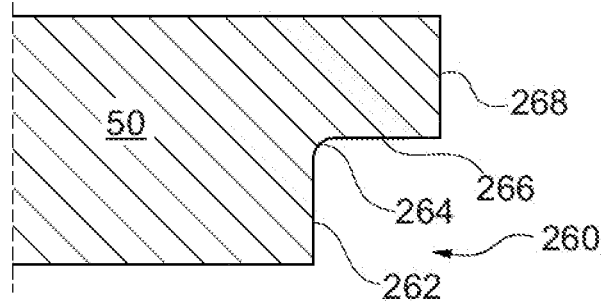
FIG. 4C is a partial enlarged view of yet another cover plate of the clutch assembly of FIG. 1.

FIGS. 3-4C show in detail the retaining feature 60 and the structures mounting the cover plate 50 to the shaft S. The retaining feature 60 is formed by removal of material at the second terminal end 54 of the cover plate, for example by machining. The retaining feature 60 includes a radially-extending face 62, a rounded corner 64, and an axially-extending face 66. A reduced-height terminal face 68 extends above the retaining feature 60. The rounded corner 64 may be circular with a radius 70, and may open at an angle 72 that is offset from vertical (in the FIG. 4 perspective) by an offset angle 74. The radially-extending face 62 has a radial height 76 and an axial length 78 set back from the terminal face 68. The axially-extending face 66 has an axial length 80 and the cover plate 50 has a thickness 82.

In particular as shown in FIG. 4A, the angle 72 may be 20 degrees to 50 degrees, in one embodiment the angle 72 may be about 35 degrees. The offset angle 74 may be 15 degrees to 40 degrees, in one embodiment the offset angle 74 may between about 26.5 and about 28.5 degrees. In an embodiment with the cover plate thickness 82 of about 3 mm, the following dimensions may be provided. The radial height 76 may be about 1 mm and the axial length 78 may be about 0.7 mm. The axial length 80 may be 0.2 mm. In a more general sense, the retaining feature 60 is formed from about half the thickness 82 of the cover plate 50.

The retaining ring 90 is mounted in a groove 4 of the shaft S, which may also have a corner notch 6. The retaining ring 90 is positioned to engage the second terminal end 54 of the cover plate 50, particularly the radially-extending face 62 and the rounded corner 64 of the retaining feature 60. The retaining ring 90 has a radial extent greater than that of the retaining feature 60. The retaining ring 90 is intended to remain seated in the groove 4 and may have complementary structure to fit in the corner notch 6. However, due to the plasticity of the retaining ring 90, under centrifugal forces it may expand outwardly. In this instance, the axially-extending face 66 and the rounded corner 64 of the retaining ring 60 catch the retaining ring and maintain engagement.

As shown in FIGS. 4B and 4C, alternative shapes are contemplated for the retaining feature 60 of the cover plate 50. In FIG. 4B, retaining feature 160 includes a radially-extending face 162, a corner 164, an axially-extending face 166, and a terminal face 168. In FIG. 4B, retaining feature 260 includes a radially-extending face 262, a rounded corner 264, an axially-extending face 266, and a terminal face 268. The rounded corner 264 has a smaller radius than the radius 70 of the relatively bulbous rounded corner 64 of FIG. 4A.

The shape of the retaining feature 60/160/260 may be chosen to complement the type of retaining ring 90 to be used. For example, the relatively bulbous rounded corner 64 is useful for a retaining ring 90 that has sharp or small-radius edges, to ensure that loads are not applied at the top of the snap ring. The right-angled corner 164 or the relatively narrow rounded corner 264 may be used with a retaining ring 90 that has relatively larger edge radii. Generally speaking, the retaining feature 60/160/260 may be considered to be integrally formed from the cover plate 50 or the terminal face 68/168/268.

The particular material of the various seals such as the seals 34, 36, 38, and 55 that is applicable to the present disclosure may be ethylene acrylic (AEM) or other conventional sealing material, such as rubber. The disc-shaped seals 38 and 54 may be molded seal rings and may have a D-shaped cross-section, referred to as "D-Rings." Alternatively, other elastomeric and polymeric materials may be used and manufactured from various processes, so long as it exhibits sufficient performance, including durability and resiliency.

The disclosed cover plate 50 and the retaining ring 90 provide the above advantages of durable retention for the rotating retaining ring 90 on the OD of the shaft S while maintaining its function of holding the cover plate against hydraulic pressures. If the retaining ring 90 was dislodged from the groove 4 completely due to centrifugal forces, the clutch system 1 would fail. The retaining feature 60 prevents such displacement while allowing the cover plate 50 to function with the hydraulic piston assembly 30 experiencing constant force from the spring 22 and dynamic force from the pressure supplied to the hydraulic chamber 40.

Having thus described the presently preferred embodiments in detail, it is to be appreciated and will be apparent to those skilled in the art that many physical changes, only a few of which are exemplified in the detailed description of the present disclosure, could be made without altering the inventive concepts and principles embodied therein. Hydraulic fluid for powering the piston 30 may be provided from a separate part of the vehicle, or one or more pumps may be incorporated into the clutch assembly 10. It is also to be appreciated that numerous embodiments incorporating only part of the preferred embodiment are possible which do not alter, with respect to those parts, the inventive concepts and principles embodied therein. For example, instead of a hydraulically-actuated piston, various other actuating means may be provided, such as an electric actuator. The present embodiments and optional configurations are therefore to be considered in all respects as exemplary and/or illustrative and not restrictive, the scope of the present disclosure being indicated by the appended claims rather than by the foregoing description, and all alternate embodiments and changes to this embodiment which come within the meaning and range of equivalency of said claims are therefore to be embraced therein.

PARTS LIST

1. Clutch Assembly
2. Groove
4. Groove
6. Notch
10. Clutch Pack
12. Clutch Plate
13. Clutch Disk
14. Clutch Plate
15. Clutch Disk
16. Clutch Plate
17. Clutch Disk
18. Clutch Plate
19. Clutch Disk
20. Plate Carrier
22. Spring
24. Balance Dam
26. Counterpressure Plate
30. Piston Assembly
32. Piston
34. Seal
36. Seal
38. Seal
40. Hydraulic Chamber
50. Cover Plate
52. First Terminal End
54. Second Terminal End
55. Seal
56. First Side
58. Second Side
60. Retaining Feature
62. Radially-extending Face
64. Rounded Corner
66. Axially-extending Face
68. Terminal Face
70. Radius
72. Angle
74. Offset Angle
76. Radial Height
78. Axial Length
80. Axial Length
82. Thickness
90. Retaining Ring
160. Retaining Feature
162. Radially-extending Face
164. Corner
166. Axially-extending Face
168. Terminal Face
260. Retaining Feature
262. Radially-extending Face
264. Rounded Corner
266. Axially-extending Face
268. Terminal Face A. Axis of Rotation
S. Shaft

What is claimed is:

1. A clutch device for a drivetrain of a motor vehicle, the clutch device comprising:
   a hydraulic piston for actuating a clutch pack;
   a biasing element contacting a first axial side of the hydraulic piston;
   a cover plate defining a hydraulic chamber between the cover plate and the hydraulic piston, the cover plate having a retaining feature and contacting a second axial side of the hydraulic piston that is opposite from the first axial side of the hydraulic piston; and
   a retaining ring for preventing axial movement of the cover plate away from the hydraulic piston,
   wherein the retaining feature limits radial expansion of the retaining ring and maintains engagement between the retaining ring and the cover plate, and
   the retaining feature is defined by a radially-extending face, a rounded corner, and an axially-extending face, and the rounded corner extends axially recessed from the axially-extending face.

2. The clutch device of claim 1, wherein the retaining ring has a radial height greater than a radial extent of the retaining feature.

3. The clutch device of claim 1, further comprising a shaft having a groove, wherein the retaining ring engages the groove of the shaft and the retaining feature of the cover plate.

4. The clutch device of claim 3, further comprising:
   an inner seal for mounting between the cover plate and the shaft; and
   an outer seal for mounting between the cover plate and the hydraulic piston, wherein the inner seal is mounted in a second groove of the shaft.

5. The clutch device of claim 1, wherein the radially-extending face has a length of about 1 mm and the axially-extending face has a length of about 0.2 mm.

6. The clutch device of claim 1, wherein the retaining feature is integrally formed from a terminal end of the cover plate.

7. The clutch device of claim 6, wherein the retaining feature is formed from about half of a thickness of the cover plate.

8. The clutch device of claim 1, wherein the cover plate is formed by stamping and the retaining feature is formed by machining the cover plate.

9. A cover plate for providing a hydraulic pressure chamber for a hydraulic piston of a clutch system for a motor vehicle, the cover plate comprising:
   a radially inner terminal end oriented in a first axial direction;
   a radially outer terminal end oriented in a second axial direction opposite from the first axial direction; and
   a retaining feature formed from the radially inner terminal end, the retaining feature including a radially extending face, a rounded corner, and an axially extending face, the rounded corner opening at an acute angle, and
   the retaining feature sized for engaging a retaining ring to prevent axial movement of the cover plate and configured to prevent radial expansion of the retaining ring.

10. The cover plate of claim 9, wherein the cover plate is configured to be mounted to a shaft with a seal disposed therebetween, the seal being received in a first groove of the shaft.

11. The cover plate of claim 10, wherein the retaining ring is configured to be received in a second groove of the shaft.

12. The cover plate of claim 9, wherein the cover plate is sealed to the hydraulic piston at the radially outer terminal end.

13. A clutch device for a drivetrain of a motor vehicle, comprising:
  a hydraulic piston for actuating a clutch pack;
  a cover plate defining a hydraulic chamber between the cover plate and the hydraulic piston, the cover plate having a retaining feature; and
  a retaining ring for preventing axial movement of the cover plate away from the hydraulic piston,
  wherein the retaining feature limits radial expansion of the retaining ring and maintains engagement between the retaining ring and the cover plate,
  wherein the retaining feature is defined by a radially-extending face, a rounded corner, and an axially-extending face, and
  wherein the rounded corner opens at an angle of about 35 degrees.

* * * * *